United States Patent [19]

Schäfer et al.

[11] 4,025,213
[45] May 24, 1977

[54] SHAFT COUPLED TO SURROUNDING HUB

[75] Inventors: Horst-Dieter Schäfer, Willich; Manfred Witzel, Moers; Paul Loosen; Hermann Haarkötter, both of Krefeld, all of Germany

[73] Assignee: Ringfeder GmbH, Krefeld-Urdingen, Germany

[22] Filed: Dec. 8, 1975

[21] Appl. No.: 638,244

[30] Foreign Application Priority Data

Dec. 9, 1974 Germany ............................ 2458229

[52] U.S. Cl. .................................. 403/370; 403/374
[51] Int. Cl.² ........................................... F16B 2/14
[58] Field of Search .......... 403/370, 371, 374, 368, 403/372, 373, 365

[56] References Cited

UNITED STATES PATENTS

| 2,811,861 | 11/1957 | Rieser | 403/370 X |
| 2,956,826 | 10/1960 | Nord | 403/368 |
| 3,847,495 | 11/1974 | Peter | 403/370 |
| 3,849,015 | 11/1974 | Peter | 403/370 |

FOREIGN PATENTS OR APPLICATIONS 467,304  8/1950  Canada .............................. 403/370

Primary Examiner—Wayne L. Shedd
Attorney, Agent, or Firm—Michael J. Striker

[57] ABSTRACT

An inner annular member of the arrangement surrounds the shaft and has an outer circumferential face two sections of which conically taper in mutually opposite directions. The inner annular member is also provided with a radially outward extending collar intermediate these sections. A pair of outer annular members each surround one of the sections with clearance and have an exterior cylindrical surface and an interior surface having a taper opposite to that of the respective section to form therewith a wedge-shaped annular clearance. The outer annular members abut from opposite axial ends against the collar. Tension members are received in the respective clearance and are drawn by both or the like inwardly of the clearance so as to force the inner member against the shaft and to the outer members against the surrounding hub, thus coupling the hub and the shaft for joint movement.

6 Claims, 4 Drawing Figures

SHAFT COUPLED TO SURROUNDING HUB

BACKGROUND OF THE INVENTION

The present invention relates to an arrangement for coupling a shaft to a surrounding hub for joint movement.

It is known from the prior art to provide an arrangement which couples a shaft to a hub for which the shaft extends, so that the hub and the shaft perform joint movements, for example joint rotation. The prior-art arrangement uses slotted rings having cylindrical faces which are to be pressed against the outer surface of the shaft in which frictional engagement therewith. This prior-art arrangement has certain disadvantages. For example, the pressure exerting rings of the arrangement necessarily differ from case to case because of the manufacturing tolerances which are involved. This means that the several rings of each arrangement will not simultaneously engage the associated component, i.e., the shaft or the hub, and will thus permit a relative movement between shaft and hub to occur. This results after such displacement in a relative position of shaft and hub in angular direction, which cannot be previously determined or calculated, and obviously highly disadvantageous occurrence. Furthermore, in the prior-art arrangement the shaft must have a rather smooth circumferential surface because it must be possible for the pressure exerting rings to slip without significance resistence to an axial direction during tension, to avoid losses of tension force. When slippage between shaft and hub occurs, it is possible that a heat-welding may take place between the shaft and the pressure rings of the coupling arrangement due to the frictional heat, or a general welding due to material flow. This can make the removal of the arrangement at a later time, when such is either desired or even necessary, difficult or even completely impossible without causing significant damage.

In addition, the prior-art arrangement is difficult to install and poses substantial problems in terms of proper mounting.

SUMMARY OF THE INVENTION

Accordingly, it is a general object of the present invention to overcome the disadvantages of the prior art.

More particularly, it is an object of the present invention to provide an improved arrangement for coupling a shaft with a surrounding hub, which is not possessed of the aforementioned disadvantages of the prior art.

Another object of the invention is to provide such an improved arrangement which reliably prevents relative movement between shaft and hub.

A further object of the invention is to provide such an arrangement which does not make it necessary that the surface of the shaft and/or the hub be particularly smooth.

A further object of the invention is to provide such an arrangement which has better operational characteristics when a slippage of shaft and hub relative to one another does occur.

Finally, it is a concommittant object of the invention to provide such an arrangement which can be installed more simply and with less difficulty than those known from the prior art.

In keeping with these objects and others which will become apparent hereafter, one feature of the invention resides in an arrangement for coupling a shaft with a surrounding hub which, briefly stated, comprises an inner annular member surrounding said shaft and having an outer circumferential face including two sections which conically taper in mutually opposite directions, and a radially outwardly extending collar intermediate these sections. A pair of outer annular members is provided, each surrounding one of these sections with clearance and having an exterior cylindrical surface and an interior surface having a taper opposite to that of the section it surrounds deformed therewith a wedge-shaped annular clearance, the outer circumferential members abutting from opposite axial ends against the collar. Tension members are received in the respective clearance, and means are provided for drawing tension members inwardly of the respective clearance to thereby force the inner member against the shaft and the outer members against the surrounding hub.

To simplify the manufacture of the arrangement and to allow for adjustment to play that may occur within the context of the overall arrangement, it is advantageous if the outer annular members are each provided with at least one axially extending slot.

To be able to manufacture the inner and outer surfaces of the outer annular members which abut against the radially extending collar of the inner annular member, in a single operation, and in order to maintain the radial dimensions of the arrangement as small as possible, one concept of the invention provides for the tapering interior surfaces of the outer annular members to be provided adjacent the end of greater radial thickness with a cylindrical surface portion which merges into the respective tapered interior surface. Similarly, the section of the inner annular member may be provided adjacent their juncture with the radially extending collar with respective annular surface portions each located opposite one of the cylindrical surface portions of the respective outer annular member, or instead of the annular cylindrical surface portions the inner annular member may be provided with grooves or similar undercuts extending circumferentially of the inner annular member. This avoids a kerf effect.

A method of the invention is directed towards the manufacture of the outer annular members, which according to the invention are produced from profiled steel strips by winding or bending to the desired annular configuration.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 1A:
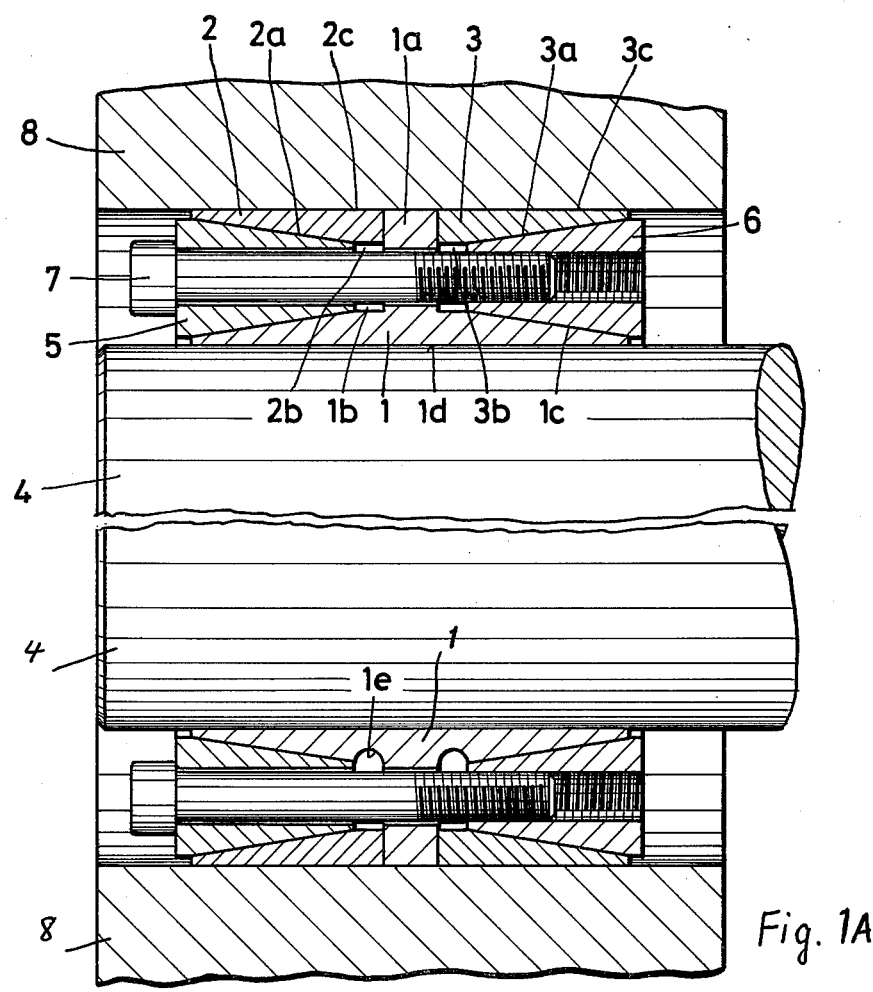
FIG. 1 is a fragmentary axial section showing an arrangement according to the present invention installed between a shaft and a hub, it being understood that the hub as well as the arrangement is annular.
FIG. 1A is a view similar to FIG. 1 but showing a somewhat modified embodiment.
Figure 2:
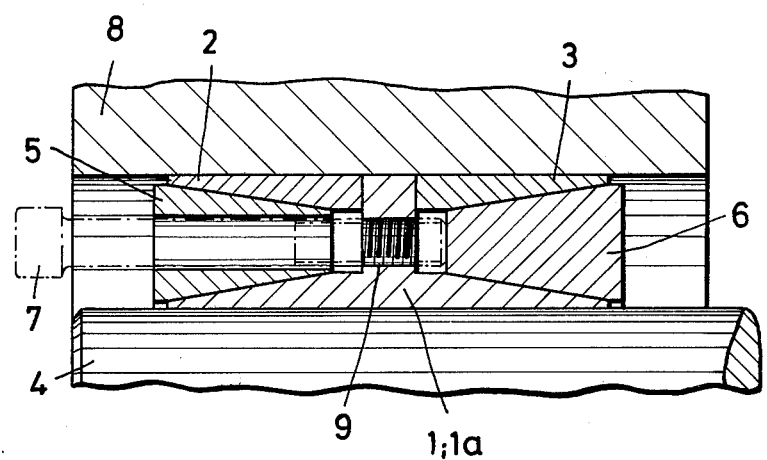
FIG. 2 is a view similar to FIG. 1, illustrating a different portion of the same arrangement to show threads by means of which the arrangement can be separated from the hub and the shaft.
Figure 3:
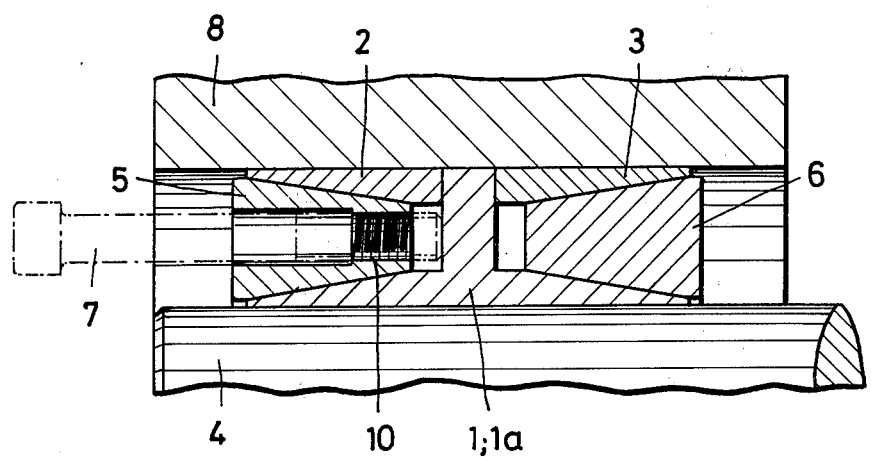
FIG. 3 is a view similar to FIG. 2 again showing a different portion to illustrate threads for the purpose mentioned in respect to FIG. 2.

FIGS. 1, 2 and 3 illustrate an exemplary embodiment of the invention; FIG. 1A illustrates a slightly modified embodiment whose operation is, however, the same as in FIGS. 1–3.

Referring firstly to the embodiment in FIGS. 1, 2 and 3 it will be seen that a shaft 4 extends with clearance through a hub 8 of a component with which it is to be coupled for rotation. Located in this clearance is an arrangement according to the present invention which is intended to effect the desired coupling. The arrangement has an inner annular member 1 which surrounds the shaft 4 and which is provided with an outer circumferential face from which a radially extending collar 1a projects which is annular and at opposite axial sides of which they are located surface sections of the outer circumferential surface which taper conically in mutually opposite axial directions of the member 1a. The member 1a is surrounded with spacing by two outer annular members 2 and 3 which surround the member 1 and which are each provided with an outer circumferential cylindrical surface 2c and 3c, respectively. The members 2 and 3 each also have an inner circumferential surface 2a and 3a respectively, which is located opposite the respective tapering surface portions of the member 1 and tapers conically in the opposite sense to the oppositely located surface portion of the member 1, thus forming with the same a wedged-shaped annular clearance. Located in this annular clearance are tension members 5 and 5a of generally annular configuration. The thicker ends of the members 2 and 3 abut against the collar 1a and are firmly pressed against the same in mutually opposite axial directions when the tension bolts or screws 7 which extend through the members 5 and 6 and draw the same together inwardly in axial direction are tightened. Such tightening causes the inner surface 1d of the member 1 to be pressed against the outer surface of the shaft 4 and further causes the outer surfaces 2c and 3c of the members 2 and 3 to be pressed against the inner circumferential surface of the hub 8.

As FIG. 1 shows, the tapering inner circumferential surfaces 2a and 3a are each formed adjacent the thicker axial end of the respective member 2 and 3 with a circumferential surface portion 2b and 3b respectively merging into the respective inner surface 2a and 3a and being located opposite a similarly formed circumferentially extending surface portion 1b which extends on the oppositely tapering sections of the outer circumferential surface of the member 1 adjacent the collar 1a thereof.

It is in this latter respect that FIG. 1A differs from FIG. 1 in that instead of the cylindrical surface portions 1b the member 1 of FIG. 1A is provided with grooves 1e which extends circumferentially of the member 1.

When the members 5 and 6 are drawing inwardly towards one another, the forces exerted upon the members 2 and 3 assures that they will press axially against the opposite axial ends of the collar 1a. This prevents all axial movements which might occur within the arrangement during the tensioning of the arrangement, so that the relative movements between the shaft 4 and the hub 8 during the installation of the arrangement and its tensioning to couple them together, are prevented.

When the arrangement is to be disengaged from the shaft 4 and the hub 8, then some of the screws or bolts 7—of which a plurality are provided which are circumferentially spaced about the shaft 4—are used as separating screws or bolts. This is done in the manner suggested in FIGS. 2 and 3. FIG. 2 shows that the bolts 7, of which one is shown in broken lines, act via threads in the collar 1a of the member 1 against the oppositely facing end face of the member 6. The member 5 is provided with threads 10 as shown in FIG. 3 which again receive screws or bolts 7 whose end faces press against the collar 1a of the member 1 so that, when they are tightened, they will loosen and extract the member 5, just as a tightening of the bolts 7 in FIG. 2 will cause the member 6 to be pushed out between the members 1 and 3.

According to a further concept of the invention, the arrangement can also be constructed counter to the illustration in FIG. 1, i.e., the member 1 can be located adjacent and in engagement with the hub 8 and the members 2 and 3 can be located adjacent and in engagement with the shaft 4. The operation and the advantages will be the same. By resorting to the use of the arrangement of the present invention, relative movement between shaft 4 and hub 8 during the installation and tightening of the arrangement are avoided. This greatly facilitates the installation because the previously necessary repeated loosening of the arrangement and repositioning of the elements 4 and 8 is now completely avoided. Moreover, the installation is further simplified in that no special requirements must be met to prevent undesired cooperation of the components of the arrangement as it is pushed into the annular clearance between the members 4 and 8, i.e., to prevent cooperation in the sense that would prevent the arrangement from being properly inserted and installed. Also, the arrangement can be readily disengaged when it is desired to uncouple the members 4 and 8 from one another and the forces to be transmitted to effect the disengagement involve only the conical surfaces of the arrangement. A particular advantage is the fact that a simple disengagement can be carried out even in the event relative slippage has occurred between shaft and hub, i.e., between either the shaft or the hub 8 and the arrangement itself. The surfaces of the shaft 4 and the hub 8 need not be as carefully prepared as with the prior art arrangements and this of course results in a reduction of the costs.

It will be understood that each of the elements described above, or two or more together, may also find a useful application in other types of constructions differing from the types described above.

While the invention has been illustrated and described as embodied in an arrangement for coupling a shaft with a surrounding hub, it is not intended to be limited to the details shown, since various modifications and structural changes may be made without departing in any way from the spirit of the present invention.

We claim:

1. An arrangement for coupling a shaft with a surrounding hub, comprising an inner annular member surrounding said shaft and having an outer circumferential face including two sections which conically taper in mutually opposite directions, and a radially outwardly extending collar intermediate and integral with said sections; a pair of separate outer annular members each surrounding one of said sections with clearance and having an exterior cylindrical surface and an interior surface having a taper opposite to that of the section it surrounds to form therewith a wedge-shaped annular clearance, said outer annular members being independently movable and abutting from opposite axial ends against said collar; tension members received in the respective clearance; and means for drawing said tension members inwardly of the respective clearance to thereby force said inner member against the shaft and said outer members against the surrounding hub.

2. An arrangement as defined in claim 1, wherein said outer annular members each have at least one axially extending slot.

3. An arrangement as defined in claim 1, said outer annular members each having one axial end of a greater radial thickness than the other axial end, said interior surface of each of said outer annular members being provided adjacent said one axial end with an inner cylindrical surface portion; and wherein said sections of said outer circumferential face of said inner annular member are each provided adjacent said collar with an outer cylindrical surface portion located opposite one of said inner cylindrical surface portions.

4. An arrangement as defined in claim 1, said outer annular members each having one axial end of a greater radial thickness than the other axial end, said interior surface of each of said outer annular members being provided adjacent said one axial end with an inner cylindrical surface portion; and wherein said sections of said outer circumferential face of said inner annular member are each provided adjacent said collar with an annular groove located opposite one of said inner cylindrical surface portions.

5. An arrangement as defined in claim 2, wherein said outer annular members are of circularly bent profiled steel strips.

6. An arrangement for coupling a shaft element with a surrounding hub element, comprising a first annular member coaxial with one of said elements and having an outer circumferential face including two sections which conically taper in mutually opposite directions, and a radially extending collar integral with and located intermediate said sections; a pair of separate second annular members each surrounding one of said sections with clearance and having a cylindrical surface and a conical surface having a taper opposite to that of the section it surrounds to form therewith a wedge-shaped annular clearance, said second annular members being independently movable and abutting from opposite axial ends against said collar; tension members received in the respective clearance; and means for drawing said tension members inwardly of the respective clearance to thereby force said first member against said one element and said second members against said other element.

* * * * *